United States Patent
Redpath

(10) Patent No.: US 9,361,710 B2
(45) Date of Patent: *Jun. 7, 2016

(54) DEFINING A MIDLET REGION SPACE

(71) Applicant: International Business Machines Corporation, Armonk, NY (US)

(72) Inventor: Richard Redpath, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 198 days.

This patent is subject to a terminal disclaimer.

(21) Appl. No.: 13/973,944

(22) Filed: Aug. 22, 2013

(65) Prior Publication Data

US 2013/0335440 A1 Dec. 19, 2013

Related U.S. Application Data

(63) Continuation of application No. 11/765,073, filed on Jun. 19, 2007, now Pat. No. 8,549,493.

(51) Int. Cl.
*G06F 9/44* (2006.01)
*G06F 3/048* (2013.01)
*G06T 11/00* (2006.01)

(52) U.S. Cl.
CPC ............... *G06T 11/001* (2013.01); *G06F 8/38* (2013.01)

(58) Field of Classification Search
CPC ........ G06F 8/38; G06F 9/4443; G06T 11/001
See application file for complete search history.

(56) References Cited

U.S. PATENT DOCUMENTS

| 6,226,017 | B1* | 5/2001 | Goossen | G06T 1/60 345/531 |
| 7,106,275 | B2* | 9/2006 | Brunner | G06T 15/40 345/32 |
| 2006/0114250 | A1* | 6/2006 | Tarle | G06F 8/67 345/419 |
| 2007/0207819 | A1* | 9/2007 | Redpath | H04L 12/581 455/466 |

OTHER PUBLICATIONS

Java Community Process, Mobile Information Device Profile for JavaTM 2 Micro Edition, May 26, 2006.*
daniel-3071500, J2ME Tutorial, Part 1: Creating MIDlets Blog, Feb. 7, 2005.*

* cited by examiner

*Primary Examiner* — Li B Zhen
*Assistant Examiner* — Lenin Paulino
(74) *Attorney, Agent, or Firm* — Steven M. Greenberg, Esq.; CRGO Law

(57) ABSTRACT

Embodiments of the present invention address deficiencies of the art in respect to MIDlet execution in a desktop environment and provide a method, system and computer program product for clip region definition for a MIDlet region space. In one embodiment of the invention, a method for clip region definition for a MIDlet region space can be provided. The method can include extracting a raster image from a MIDlet, computing a clip region from the extracted raster image for the MIDlet, deploying the MIDlet to a desktop environment through an emulator, and applying the clip region to the MIDlet through the emulator to deploy the MIDlet as a widgetized application in the desktop environment.

11 Claims, 2 Drawing Sheets

DEFINING A MIDLET REGION SPACE

CROSS-REFERENCE TO RELATED APPLICATION

This application is a Continuation Application of U.S. Application No. 11/765,073, filed on Jun. 19, 2007, now U.S. Pat. No. 8,549,493, entitled "DEFINING A MIDLET REGION SPACE", the entirety of which is incorporated herein by reference.

BACKGROUND OF THE INVENTION

1. Field of the Invention

The present invention relates to the field of mobile application development, and more particularly to the field of Mobile Information Device Applet (MIDlet) emulation in a desktop environment.

2. Description of the Related Art

Mobile application development has evolved in time from proprietary coding schemes in which applications were developed for a particular host device and stored in fixed media such as a read-only memory (ROM), to portable coding schemes in which an application can be coded in a general purpose programming language and packaged for distribution to any number of compatible mobile devices through a mere extension to a conventional programming environment. The Java™ language MIDlet represents one well-known mobile application development environment. A MIDlet is a Java™ language program for embedded devices, more specifically the Java™ Micro Edition (ME) virtual machine.

Like other Java programs, MIDlets are write once, run anywhere. To facilitate write once, run anywhere, the basic components of any MIDlet suite include a Java Application Descriptor (JAD) file and a Java Archive (JAR) file. The JAD file describes a MIDlet suite including the name of the MIDlet suite, the location and size of the JAR file, and the configuration and profile requirements. The JAD file optionally can include other attributes defined by the Mobile Information Device Profile (MIDP), by the MIDlet developer, or both. The JAR, by comparison, contains one or more MIDlets, specified in the JAD. Finally, a manifest file can be provided within the JAR. The manifest can include the same syntax as the JAD file and can share the same attributes. In addition to the Java class files and the manifest, the JAR file can include other resources including images that the MIDlet can load using the createImage(String) method. The MIDlet can also use getResourceAsStream(String) to access any resource in the JAR file as an InputStream. In both cases, the String argument can include a pathname identifying a resource in the JAR file.

Though MIDlets intend to be executed in a mobile device, MIDlets can be executed on the desktop within an emulation environment. The emulation environment can be fixed in terms of display space and the MIDlet can be contained within the fixed display space. Permitting a MIDlet to execute outside of the display space, however, would be highly desirable given the apparent popularity of desktop widgets in modern computing. In this regard, to deploy a widget in a desktop environment normally requires the presence of a widget engine enabled to process the markup language specified user interface and logic of a widget. In the absence of a widget engine, widgets cannot operate in the desktop environment.

To enable the deployment of a MIDlet in a desktop environment to emulate a widget, first a clip region must be established to provide for event handling for the MIDlet relative to the remainder of the desktop environment. Yet, to enable widget like behavior for MIDlet applications in a desktop environment would require integration with the diaphanous feature of the emulation environment—namely determining how to provide a degree of transparency about the perimeter of the MIDlet application while maintaining a defined clip region for event handling of the MIDlet application in the desktop environment.

BRIEF SUMMARY OF THE INVENTION

Embodiments of the present invention address deficiencies of the art in respect to MIDlet execution in a desktop environment and provide a novel and non-obvious method, system and computer program product for clip region definition for a MIDlet region space. In one embodiment of the invention, a method for clip region definition for a MIDlet region space can be provided. The method can include extracting a raster image from a MIDlet, computing a clip region from the extracted raster image for the MIDlet, deploying the MIDlet to a desktop environment through an emulator, and applying the clip region to the MIDlet through the emulator to deploy the MIDlet as a widgetized application in the desktop environment.

In one aspect of the embodiment, computing a clip region from the extracted raster image for the MIDlet can include scanning the raster image line by line, pixel by pixel seeking out an opaque pixel initiating the line segment and a transparent pixel terminating the line segment. In this regard, a pixel can be considered to be transparent if the pixel is a given color such as red and otherwise the pixel can be determined to be opaque. Each line can be clipped between the opaque pixel and the transparent pixel. Additionally, each clipped line can be merged with one another to create a clipped region. Finally, in another aspect of the embodiment, applying the clip region to the MIDlet through the emulator to deploy the MIDlet as a widgetized application in the desktop environment can include setting a parent window for a diaphanous feature of the emulator to the clip region, and setting a child window for the diaphanous feature to the MIDlet. Notably, the foregoing technique further can be applied to an applet executing in a desktop environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for clip region definition for a MIDlet region space. In accordance with an embodiment of the present invention, a raster image of a MIDlet application can be selected from a MIDlet suite and a clip region can be computed for the raster image including red-green-blue (RGB) data. Subsequently, the club region can be utilized as the parent window for a diaphanous feature of the MIDlet emulator while the MIDlet application can be drawn in the child window of the MIDlet emulator. Finally, transparency can be applied to the parent window according to alpha values in the RGB data for the clip region. In this way, the clip region can be defined for the MIDlet application by reference to the raster image deployed in the MIDlet suite in order to enable clipped region widgets in the desktop environment.

Figure 1:
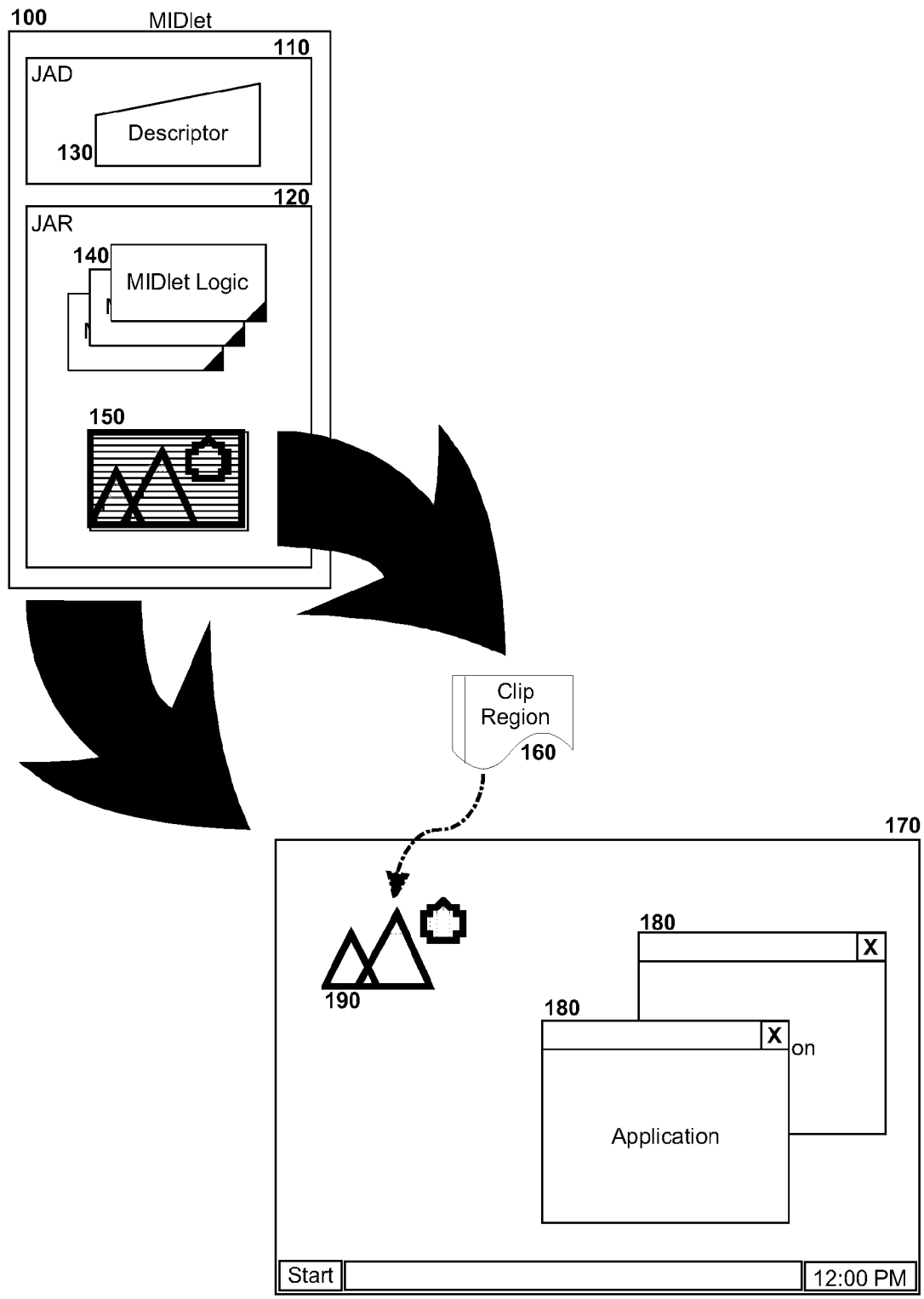
FIG. 1 is a pictorial illustration of a process for clip region definition for a MIDlet region space.

In illustration, FIG. 1 pictorially depicts a process for clip region definition for a MIDlet region space. In accordance with an embodiment of the invention, a MIDlet 100 can be packaged for deployment into a desktop environment 170 configured to support not only general application instances 180 bounded by a corresponding application user interface, but also a widgetized application 190 unbounded by an emulator user interface. The MIDlet 100 itself can include JAD 110 and JAR 120. The JAD 110 can include a descriptor 130 of the content of the MIDlet 100 including a manifest of the JAR 120. The JAR 120, in turn, can include different logical files 140 defining the operational functionality of the MIDlet 100 as well as one or more supporting resources, including a raster image 150 of the MIDlet user interface.

In order to support the deployment of the MIDlet 100 into a desktop environment 170 unbounded by an emulator user interface, a clip region 160 can be established for the MIDlet 100. In this regard, the clip region 160 can be computed from the raster image 150 within the MIDlet 100 by differentiating between that portion of the raster image 150 that is to be opaque in nature and that portion of the raster image 150 that is to be transparent in nature so as to blend with the background of the desktop environment 170. The clip region 160 in turn can be provided when computing the window for the widgetized application 190 such that user interface events occurring within the window can be attributed to the widgetized application 190, while user interface events occurring outside of the window can be attributed elsewhere.

Figure 2:
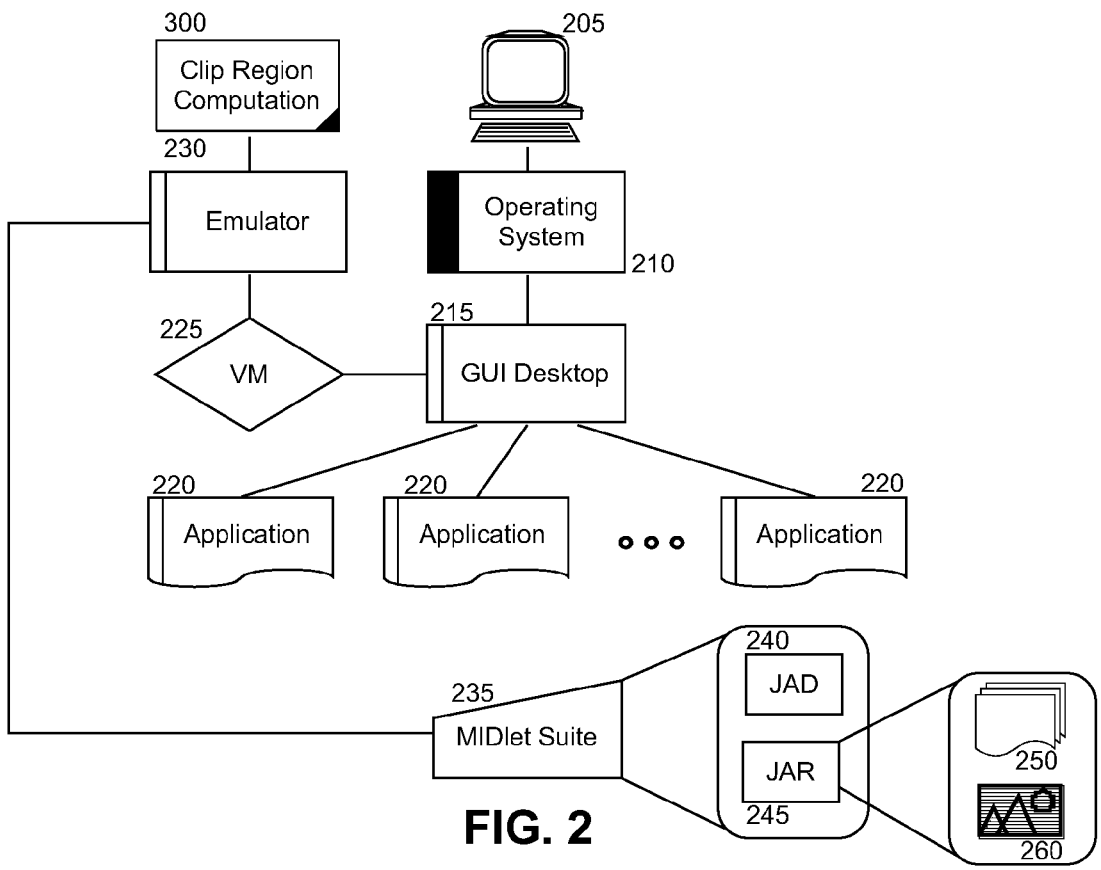
FIG. 2 is a schematic illustration of a desktop user interface data processing system configured for clip region definition for a MIDlet region space; and, FIG. 3 is a flow chart illustrating a process for clip region definition for a MIDlet region space.

In further illustration, FIG. 2 is a schematic illustration of a desktop user interface data processing system configured for clip region definition for a MIDlet region space. The system can include a support computing platform 205 including an operating system 210 for providing a desktop computing environment 215. The desktop computing environment 215 can support the execution of one or more applications 220 bound by respective graphical user interfaces. The desktop computing environment 215 further can be coupled to a virtual machine 225 enabled to process platform neutral program code, such as that conforming to the Java™ programming language. In this way, platform neutral program code can execute within the confines of the virtual machine 225 in the desktop computing environment 215.

Notably, an emulator 230 can be provided. The emulator 230 can be enabled to emulate to operation of a MIDlet 235 as if the MIDlet 235 were executing in a pervasive device environment such as a cellular telephone or personal digital assistant despite the desktop environment 215. The MIDlet 235 itself can include both a JAD 240 and JAR 245 as is well known in the art. The JAR 245, in turn, can include both logic files 250 such as Java™ classes, in addition supporting resources including a raster image 260 for the MIDlet 235.

The emulator 230 further can be coupled to clip region computation logic 300. The logic 300 can include program code enabled to compute a clip region from the raster image 260 in the MIDlet 235. In this regard, the program code can identify the raster image 260 in the JAD 240 which can include a reference to the raster image 260 in the JAR 245. Thereafter, the raster image 260 can be scanned line by line, pixel by pixel seeking out an opaque pixel initiating the line segment and a transparent pixel terminating the line segment and clipping the line. Each clipped line can be ORed with each other clipped line to create a clipped region. In one aspect of the embodiment, the opacity of a segment can correspond to non-red pixels for opacity and red-pixels for transparency (red color freeing to a selected color as the opaque pixel).

Once a clip region has been computed for the MIDlet 235, the clip region can be applied to the parent window of the diaphanous feature of the emulator 230, while the use interface of the MIDlet 235 itself can be drawn in the child window of the diaphanous feature of the emulator 230. Optionally, the raster image 260 can be used as a background image of the MIDlet 235. In that circumstance, the alpha component of the RGB data for the raster image 260 can be used to signal transparency. In this way, the MIDlet 235 can be deployed into the desktop environment unbounded by the user interface of the emulator 230 as a widgetized application.

Figure 3:
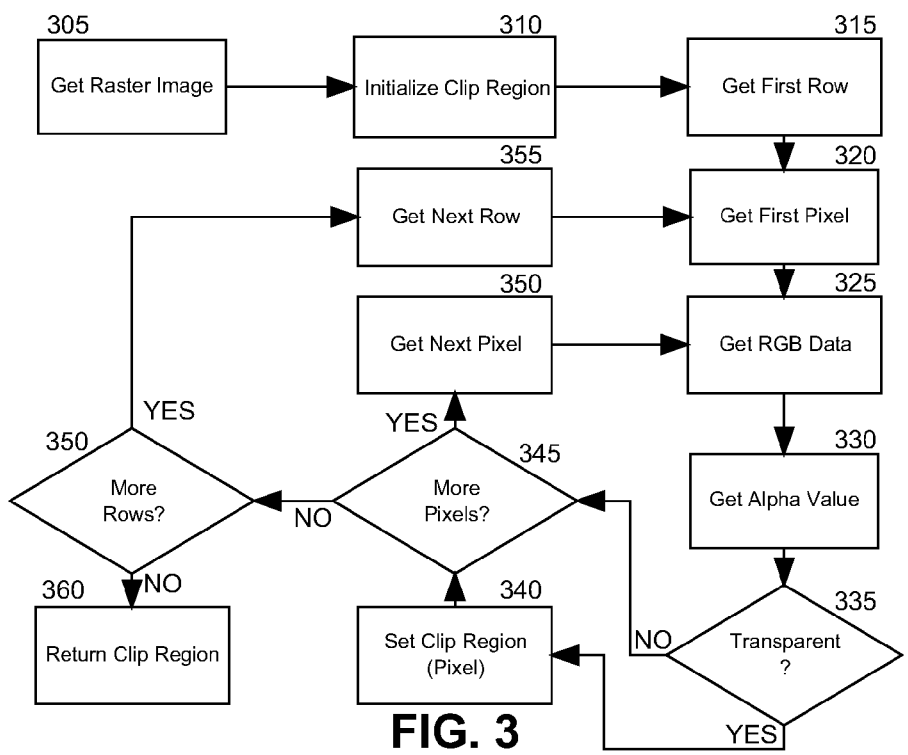

In even yet further illustration, FIG. 3 is a flow chart illustrating a process for clip region definition for a MIDlet region space. Beginning in block 305, a raster image can be retrieved from a MIDlet suite for a MIDlet and a clip region can be initialized for the MIDlet. In block 315, a first row of the raster image can be selected for processing and in block 320 a first pixel in the row can be selected for processing. In block 325, the RGB data for the pixel can be retrieved and in block 330, an alpha value for the pixel can be determined. Thereafter, in decision block 335 it can be determined whether the pixel is transparent. If so, the segment for the row can be clipped and merged with a clip region for the raster image.

In decision block 345, if more pixels remain to be processed for the row, in block 350 a next pixel can be selected for processing and in block 325, once again the RGB data for the pixel can be retrieved and in block 330, an alpha value for the pixel can be determined. Thereafter, in decision block 335 it can be determined whether the pixel is transparent. When no further pixels remain to be processed, in decision block 350 it can be determined whether additional rows of the raster image remain to be processed. In so, in block 355 a next row can be retrieved for processing and the process can repeat through block 320. Otherwise, in decision block 350 when the complete raster image has been processed, in block 360 a clip region can be returned for use in rendering the MIDlet in the desktop environment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for clip region definition for a Mobile Information Device Applet (MIDlet) region space, the method comprising:
   extracting a raster image from a MIDlet;
   computing a clip region from the extracted raster image for the MIDlet comprising scanning the raster image line by line, pixel by pixel seeking out an opaque pixel initiating the line segment and a transparent pixel terminating the line segment, clipping the line between the opaque pixel and the transparent pixel, and merging each clipped line with one another to create a clipped region;
   deploying the MIDlet to a desktop environment through an emulator; and,
   applying the clip region to the MIDlet through the emulator to deploy the MIDlet as a widgetized application in the desktop environment.

2. The method of claim 1, further comprising:
   setting a background for the emulator to the raster image; and,
   determining transparency of the background according to alpha values for red-green-blue (RGB) data for the raster image.

3. The method of claim 1, wherein extracting the raster image from the MIDlet, comprises:
   identifying the raster image in a Java Application Descriptor (JAD) file for the MIDlet; and,
   extracting the identified raster image from a Java Archive (JAR) file for the MIDlet.

4. The method of claim 1, further comprising determining a pixel to be transparent when the pixel is a specified color and otherwise determining the pixel to be opaque when a transparency overlay is not available.

5. A Mobile Information Device Applet (MIDlet) data processing system comprising:
   a processor coupled to memory;
   an emulator executing on the processor in a desktop computing environment; and,
   clip region computing logic executing on the processor and coupled to the emulator, the clip region computing logic comprising program code enabled to extract a raster image from a MIDlet, compute a clip region from the extracted raster image for the MIDlet comprising scanning the raster image line by line, pixel by pixel seeking out an opaque pixel initiating the line segment and a transparent pixel terminating the line segment, clipping the line between the opaque pixel and the transparent pixel, and merging each clipped line with one another to create a clipped region, deploy the MIDlet to the desktop computing environment through the emulator, and apply the clip region to the MIDlet through the emulator to deploy the MIDlet as a widgetized application in the desktop computing environment.

6. The system of claim 5, wherein the MIDlet comprises:
   a Java Application Descriptor (JAD) file describing the MIDlet and referencing the raster image; and,
   a Java Archive (JAR) file storing a plurality of logic files and resources including the raster image.

7. The system of claim 5, wherein the emulator further comprises a background image set to the raster image.

8. A computer program product comprising a non-transitory computer memory storing computer usable program code for clip region definition for a Mobile Information Device Applet (MIDlet) region space, the computer program product comprising:
   computer usable program code for extracting a raster image from a MIDlet;
   computer usable program code for computing a clip region from the extracted raster image for the MIDlet comprising computer usable program code for scanning the raster image line by line, pixel by pixel seeking out an opaque pixel initiating the line segment and a transparent pixel terminating the line segment, computer usable program code for clipping the line between the opaque pixel and the transparent pixel, and computer usable program code for merging each clipped line with one another to create a clipped region;
   computer usable program code for deploying the MIDlet to a desktop environment through an emulator; and,
   computer usable program code for applying the clip region to the MIDlet through the emulator to deploy the MIDlet as a widgetized application in the desktop environment.

9. The computer program product of claim 8, further comprising:
   computer usable program code for setting a background for the emulator to the raster image; and,
   computer usable program code for determining transparency of the background according to alpha values for red-green-blue (RGB) data for the raster image.

10. The computer program product of claim 8, wherein the computer usable program code for extracting the raster image from the MIDlet, comprises:
    computer usable program code for identifying the raster image in a Java Application Descriptor (JAD) file for the MIDlet; and,
    computer usable program code for extracting the identified raster image from a Java Archive (JAR) file for the MIDlet.

11. The computer program product of claim 8, further comprising computer usable program code for determining a pixel to be transparent when the pixel is red and otherwise determining the pixel to be opaque.

* * * * *